United States Patent
Itoh et al.

(10) Patent No.: US 10,450,916 B2
(45) Date of Patent: Oct. 22, 2019

(54) PLASMA REACTOR

(71) Applicants: NGK SPARK PLUG CO., LTD., Nagoya-shi, Aichi (JP); TOKYO ROKI CO., LTD., Yokohama-shi, Kanagawa (JP)

(72) Inventors: Shinsuke Itoh, Konan (JP); Norihiko Nadanami, Inuyama (JP); Yu Ebara, Yokohama (JP)

(73) Assignees: NGK SPARK PLUG CO., LTD., Nagoya (JP); TOKYO ROKI CO., LTD., Yokohama (JP)

( * ) Notice: Subject to any disclaimer, the term of this patent is extended or adjusted under 35 U.S.C. 154(b) by 0 days.

(21) Appl. No.: 16/079,146

(22) PCT Filed: Feb. 27, 2017

(86) PCT No.: PCT/JP2017/007359
§ 371 (c)(1),
(2) Date: Aug. 23, 2018

(87) PCT Pub. No.: WO2017/150414
PCT Pub. Date: Sep. 8, 2017

(65) Prior Publication Data
US 2019/0055869 A1 Feb. 21, 2019

(30) Foreign Application Priority Data
Mar. 1, 2016 (JP) .................................. 2016-038749

(51) Int. Cl.
*F01N 3/08* (2006.01)
*B01J 19/08* (2006.01)
(Continued)

(52) U.S. Cl.
CPC ........... *F01N 3/0892* (2013.01); *B01D 53/32* (2013.01); *B01D 53/92* (2013.01); *B01J 19/08* (2013.01);
(Continued)

(58) Field of Classification Search
CPC ....... F01N 3/0892; F01N 3/028; B01D 53/92; B01J 19/08; H05H 1/24
(Continued)

(56) References Cited

U.S. PATENT DOCUMENTS 6,007,681 A   12/1999  Kawamura et al.
6,274,006 B1   8/2001  Kawamura et al.
(Continued)

FOREIGN PATENT DOCUMENTS

JP    H10-033937 A    2/1998
JP      3832654 A    10/2003
(Continued)

OTHER PUBLICATIONS

Japan Patent Office, Written Opinion issued in corresponding Application No. PCT/JP2017/007359 dated Apr. 4, 2017 (translation not available).
(Continued)

*Primary Examiner* — Tom P Duong
(74) *Attorney, Agent, or Firm* — Stites & Harbison, PLLC; Jeffrey A. Haeberlin; James R. Hayne (57) ABSTRACT

Provided is a plasma reactor capable of reliably generating plasma even in the event of inflow of water. The plasma reactor of the present invention includes a plasma panel stack 20, electrically conductive members 51 and 54, a case, and a mat 71. The plasma panel stack 20 has a structure in which electrode panels 30 are stacked, and generates plasma upon application of voltage between the adjacent electrode panels 30. The electrically conductive members 51 and 54
(Continued)

are electrically connected to discharge electrodes of the electrode panels 30. The case houses the plasma panel stack 20. The mat 71 intervenes between the case and the plasma panel stack 20 and fixes the plasma panel stack 20 to the case. The mat 71 is disposed apart from the electrically conductive members 51 and 54 so that gaps S1 and S2 are formed between the mat 71 and the electrically conductive members 51 and 54, respectively.

5 Claims, 7 Drawing Sheets

(51) Int. Cl.
*B01D 53/92* (2006.01)
*F01N 3/028* (2006.01)
*H05H 1/24* (2006.01)
*B01D 53/32* (2006.01)
*H05H 1/48* (2006.01)

(52) U.S. Cl.
CPC .............. *F01N 3/028* (2013.01); *H05H 1/24* (2013.01); *H05H 1/48* (2013.01)

(58) Field of Classification Search
USPC .................................. 422/174, 170, 186.04
See application file for complete search history.

(56) References Cited

U.S. PATENT DOCUMENTS

| | | |
|---|---|---|
| 6,344,701 B1 | 2/2002 | Kawamura et al. |
| 6,464,945 B1* | 10/2002 | Hemingway .......... B01D 53/32 |
| | | 422/174 |
| 6,797,241 B2 | 9/2004 | Foster |
| 7,078,000 B2 | 7/2006 | Foster et al. |
| 2003/0180199 A1 | 9/2003 | Kim |
| 2006/0152133 A1 | 7/2006 | Miyairi |
| 2006/0208650 A1 | 9/2006 | Kondou et al. |
| 2010/0329940 A1* | 12/2010 | Takahashi .............. B01J 19/088 |
| | | 422/186.04 |

FOREIGN PATENT DOCUMENTS

| | | |
|---|---|---|
| JP | 2006-261040 A | 9/2006 |
| JP | 4448097 B2 | 4/2010 |
| WO | 2007-086430 A1 | 8/2007 |

OTHER PUBLICATIONS

Japan Patent Office, International Search Report issued in corresponding Application No. PCT/JP2017/007359 dated Apr. 4, 2017.
European Patent Office, Extended European Search Report issued in corresponding Application No. 17759880.2, dated Aug. 9, 2019.

* cited by examiner

PLASMA REACTOR

TECHNICAL FIELD

The present invention relates to a plasma reactor, and more particularly to a plasma rector suitable for an apparatus for cleaning exhaust gas from an internal combustion engine.

BACKGROUND ART

Conventionally, there has been proposed a plasma reactor for processing harmful substances, such as CO (carbon monoxide), HC (hydrocarbon), $NO_x$ (nitrogen oxide), and PM (particulate matter), contained in exhaust gas from an engine or an incinerator, by passing exhaust gas through a plasma field.

For example, according to proposed various plasma reactors (see Patent Documents 1 to 3), a plurality of electrode panels each having a discharge electrode are stacked, and voltage is applied between the adjacent electrode panels to generate low-temperature plasma (nonequilibrium plasma) by dielectric barrier discharge, thereby removing, through oxidation, PM contained in exhaust gas flowing between the electrode panels. The plasma reactors described in Patent Documents 1 to 3 include a case for housing a plasma panel stack composed of a stack of electrode panels, and a mat intervening between the case and the plasma panel stack. The plasma reactors further include electrically conductive members electrically connected to discharge electrodes. The electrically conductive members are in contact with the case through the mat. For example, according to Patent Document 2, lead line members serving as the electrically conductive members are in contact with a housing (case) through the mat.

PRIOR ART DOCUMENTS

Patent Documents

Patent Document 1: U.S. Pat. No. 6,464,945 (FIG. 8, etc.)
Patent Document 2: Japanese Patent No. 3832654 (FIG. 4, etc.)
Patent Document 3: Japanese Patent No. 4448097 (FIG. 9, etc.)

DISCLOSURE OF THE INVENTION

Problem to be Solved by the Invention

Incidentally, in use of a plasma reactor mounted in a vehicle or the like, water may flow into the plasma reactor in some cases. Examples of water to flow into the plasma reactor include exhaust condensed-water deriving from condensation within an exhaust pipe in the event of cold start of a vehicle, and water flowing in through a muffler as a result of a vehicle's entry into a puddle.

However, according to the conventional techniques described in Patent Documents 1 to 3, in the event of inflow of water into the plasma reactor, since a mat having electric insulation in a dry state absorbs water and comes into a water-containing state, electric insulation of the mat deteriorates. As a result, electrical conduction is established between the electrically conductive member and the case through the water-containing mat, potentially resulting in generation of leak current. In this case, since the amount of generation of plasma reduces in relation to supplied electric power, the efficiency in cleaning exhaust gas lowers.

The present invention has been conceived in view of the above problem, and an object of the invention is to provide a plasma reactor capable of reliably generating plasma even in the event of inflow of water.

Means for Solving the Problem

Means (means 1) for solving the above problem is a plasma reactor comprising: a plasma panel stack having a structure in which a plurality of electrode panels each having a discharge electrode are stacked, and generating plasma upon application of voltage between the adjacent electrode panels; an electrically conductive member electrically connected to the discharge electrodes of the plurality of electrode panels; a case housing the plasma panel stack; and a mat intervening between the case and the plasma panel stack and fixing the plasma panel stack to the case. The plasma reactor is characterized in that the mat is disposed apart from the electrically conductive member so that a gap is present between the mat and the electrically conductive member.

According to the invention described above in means 1, the mat intervening between the case and the plasma panel stack is disposed apart from the electrically conductive member so that a gap is present between the mat and the electrically conductive member. As a result, insulation is secured between the mat and the electrically conductive member connected to the discharge electrodes of the plasma panel stack and, in turn, between the electrically conductive member and the case. Accordingly, even when the mat absorbs water and comes into a water-containing state as a result of inflow of water into the plasma reactor, since electrical conduction between the electrically conductive member and the case through the mat is prevented, there can be prevented the generation of leak current which could otherwise result from electrical conduction between the electrically conductive member and the case. Consequently, since plasma is generated in a sufficient amount in relation to supplied electric power, PM contained in exhaust gas flowing between the adjacent electrode panels can be efficiently removed through oxidation by use of plasma.

The plasma panel stack which partially constitutes the above plasma reactor has a structure in which a plurality of the electrode panels each having the discharge electrode are stacked. Examples of material used to form the discharge electrode include tungsten (W), molybdenum (Mo), ruthenium oxide ($RuO_2$), silver (Ag), copper (Cu), and platinum (Pt).

Preferably, the gap between the mat and the electrically conductive member has a size of 2 mm to 30 mm, for example. If the gap is less than 2 mm, creeping discharge is apt to occur, potentially resulting in electrical conduction between the electrically conductive member and the case through the mat. If the gap is greater than 30 mm, the contact area between the case and the mat and the contact area between the mat and the plasma panel stack reduce, potentially resulting in a failure to reliably fix the plasma panel stack to the case through the mat. The gap formed between the mat and the electrically conductive member varies in accordance with voltage required for forming plasma. As is known, in general, a gap of 1 mm per kV must be provided in order to prevent the generation of creeping discharge. Therefore, the gap formed between the mat and the electrically conductive member is determined in accordance with voltage to be applied between the electrode panels.

No particular limitation is imposed on a structure in which a gap is present between the mat and the electrically conductive member. For example, the gap is formed between the mat and the electrically conductive member by forming a cutout extending through the mat in a thickness direction of the mat so as to avoid interference between the mat and the electrically conductive member, or by disposing a plurality of mats apart from one another and locating the electrically conductive member between the adjacent mats. The structure having the cutout in the mat can reduce the number of parts and facilitates the work of attaching the mat as compared with the structure using a plurality of mats. In the meantime, the structure in which a plurality of mats are disposed apart from one another allows easy formation of the structure having the gap as compared with the structure having the cutout in the mat.

Another means (means 2) for solving the above problem is a plasma panel stack having a structure in which a plurality of electrode panels each having a discharge electrode are stacked, and generating plasma upon application of voltage between the adjacent electrode panels with gas passing between the adjacent electrode panels; an electrically conductive member electrically connected to the discharge electrodes of the plurality of electrode panels; a case housing the plasma panel stack; and a mat intervening between the case and the plasma panel stack and fixing the plasma panel stack to the case. The plasma reactor is characterized in that a plurality of the mats are disposed apart from one another along a passing direction of the gas.

According to the invention described above in means 2, a plurality of the mats intervene between the case and the plasma panel stack and are disposed apart from one another along the passing direction of gas. Accordingly, even when, as a result of inflow of water into the plasma panel stack from an upstream side or a downstream side in the course of passage of gas, a mat located on an inflow side of water absorbs water and comes into a water-containing state, the mat retains water therein. Thus, the other mats located apart from the mat are unlikely to be exposed to water, thereby preventing the case where all of the plurality of mats absorb water. As a result, since infiltration of water between the plasma panel stack and the case can be reduced, deterioration in electrostatic capacity between the electrically conductive member and the case is restrained. Therefore, there can be restrained the generation of leak current which could otherwise result from electrical conduction (i.e., excessive reduction in electrostatic capacity) between the electrically conductive member and the case. Consequently, since plasma is generated in a sufficient amount in relation to supplied electric power, PM contained in exhaust gas flowing between the adjacent electrode panels can be efficiently removed through oxidation by use of plasma.

The mats may have the same dimensions. Since employment of such a dimensional feature allows preparation of only one type of the mats, production at low cost can be readily achieved. Each of the mats may have a rectangular frame shape as viewed from a side. Since such a shape is suited for application to the plasma panel stack having an approximately rectangular parallelepiped shape, the plasma reactor can be manufactured relatively easily.

BEST MODE FOR CARRYING OUT THE INVENTION

An embodiment of a plasma reactor 1 of the present invention will next be described in detail with reference to the drawings.

As shown in FIGS. 1 to 4, the plasma reactor 1 of the present embodiment is a device for removing PM contained in exhaust gas from an automobile engine (not shown) and is attached to an exhaust pipe 2. The plasma reactor 1 includes a pulse generation power supply 3, a case 10, and a plasma panel stack 20.

The case 10 is formed into a rectangular tubular shape by use of stainless steel, for example. A first cone 11 is connected to a first end portion (a left end portion in FIG. 1) of the case 10, and a second cone 12 is connected to a second end portion (a right end portion in FIG. 1) of the case 10. Further, the first cone 11 is connected to an upstream portion 4 (an engine-side portion) of the exhaust pipe 2, and the second cone 12 is connected to a downstream portion 5 (a portion opposite the engine-side portion) of the exhaust pipe 2. Exhaust gas from the engine flows from the upstream portion 4 of the exhaust pipe 2 into the case 10 through the first cone 11, passes through the case 10, and then flows out to the downstream portion 5 of the exhaust pipe 2 through the second cone 12.

As shown in FIGS. 1 and 3 to 8, the plasma panel stack 20 is housed in the case 10 and has an approximately rectangular parallelepiped shape having a pair of gas passage faces 21 and 22 and four gas non-passage faces 23, 24, 25, and 26. The two gas passage faces 21 and 22 are located opposite each other in the plasma panel stack 20. The gas non-passage faces 23 to 26 are located between the two gas passage faces 21 and 22.

The plasma panel stack 20 has a structure in which a plurality of electrode panels 30 are stacked. The electrode panels 30 are disposed in parallel with an exhaust gas passing direction (the direction from the first cone 11 toward the second cone 12) in the case 10 and are spaced apart from one another (at a clearance of 0.5 mm in the present embodiment).

Figure 1:
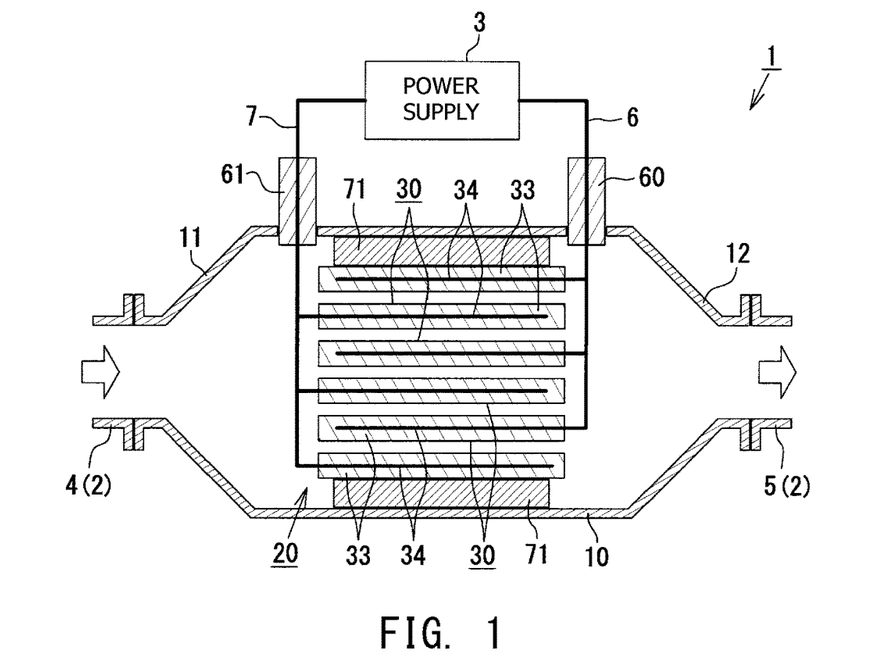
FIG. 1 Schematic sectional view showing a plasma reactor of the present embodiment.

As shown in FIG. 1, a first wiring line 6 and a second wiring line 7 are electrically connected alternately to the electrode panels 30 along a thickness direction of the plasma panel stack 20. The first wiring line 6 is electrically connected to a first terminal of the pulse generation power supply 3, and the second wiring line 7 is electrically connected to a second terminal of the pulse generation power supply 3.

Figure 9:
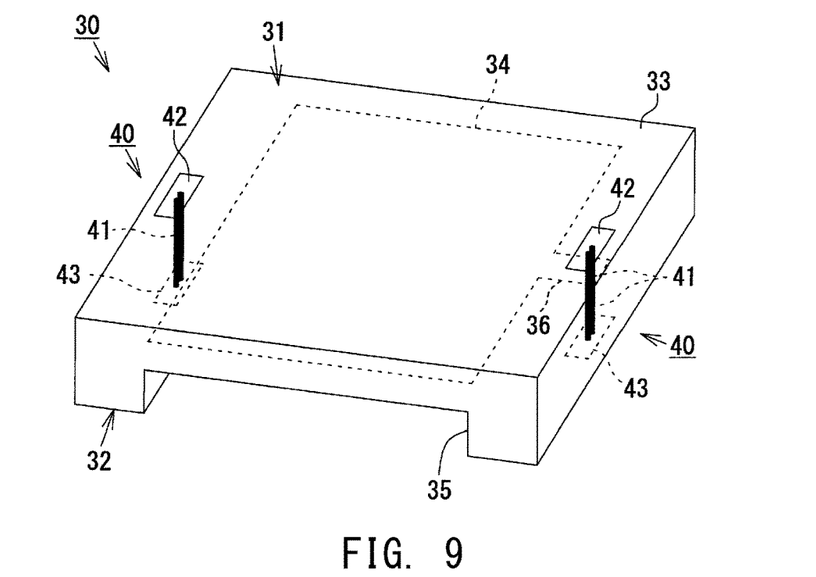
FIG. 9 Perspective view showing an electrode panel.

As shown in FIGS. 1 and 9, the electrode panel 30 of the present embodiment has a first main surface 31 and a second main surface 32 and has an approximately rectangular plate shape measuring 100 mm length×200 mm width. The first main surface 31 and the second main surface 32 are located opposite each other with respect to the thickness direction of the electrode panel 30. Further, the electrode panel 30 has a structure in which a discharge electrode 34 (thickness 10 µm) is incorporated in a dielectric 33 having a rectangular plate shape. In the present embodiment, the dielectric 33 is formed of ceramic such as alumina ($Al_2O_3$), and the discharge electrode 34 is formed of tungsten (W). The dielectric 33 has a recess 35 which opens at the second main surface 32. The recess 35 extends in a lateral direction of the electrode panel 30 and opens at the opposite end surfaces of the electrode panel 30. In the plasma panel stack 20 of the present embodiment, the recess 35 and the first main surface 31 of the lower adjacent electrode panel 30 define an exhaust gas passage. The bottom electrode panel 30 of the plasma panel stack 20 does not have the recess 35, since the lower adjacent electrode panel 30 is not present.

As shown in FIG. 9, the electrode panel 30 has electrically conductive structures 40 provided respectively on opposite sides of the recess 35 for establishing electrical conduction between the first main surface 31 side and the second main surface 32 side. Each electrically conductive structure 40 includes a through hole conductor 41 serving as the electrically conductive member, a first pad 42, and a second pad 43. The through hole conductors 41 extend through the first main surface 31 and the second main surface 32. The through hole conductor 41 of one electrically conductive structure 40 extends through an extension 36 extending from the discharge electrode 34 toward a periphery side in addition to through the first main surface 31 and the second main surface 32. The first pad 42 is formed on the first main surface 31 and is electrically connected to an end portion of the through hole conductor 41 on the first main surface 31 side. The second pad 43 is formed on the second main surface 32 and is electrically connected to an end portion of the through hole conductor 41 on the second main surface 32 side. Each of the first pad 42 and the second pad 43 has a rectangular shape and is plated with Ni or the like.

Figure 7:
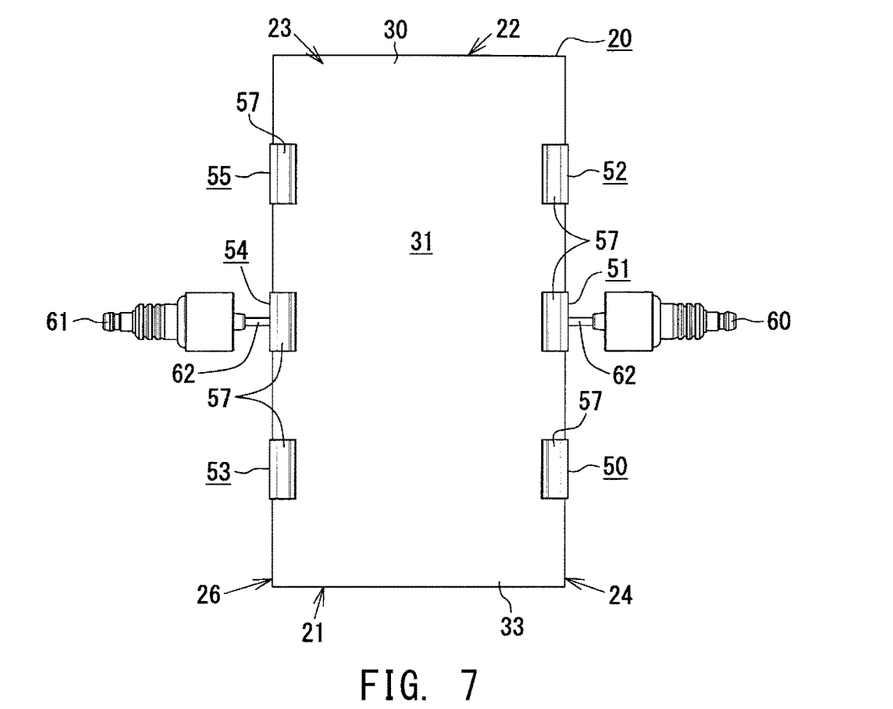
FIG. 7 Plan view showing the plasma panel stack, the clamps, and the external terminals.
Figure 8:
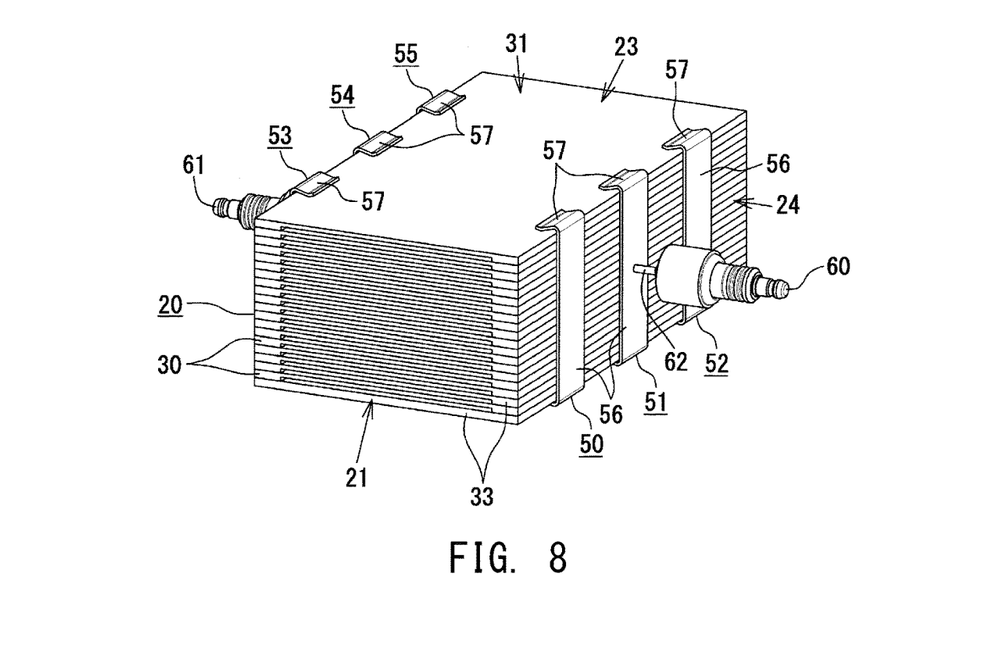
FIG. 8 Perspective view showing the plasma panel stack, the clamps, and the external terminals.

As shown in FIGS. 7 and 8, the plasma reactor 1 has three first clamps 50, 51, and 52 which fixedly clamp the electrode panels 30 (the plasma panel stack 20) from the gas non-passage face 24 side, and three second clamps 53, 54, and 55 which fixedly clamp the electrode panels 30 from the gas non-passage face 26 side. Each of the clamps 50 to 55 is formed by bending a metal plate (e.g., a stainless steel plate). The first clamps 50 to 52 are disposed on the gas non-passage face 24 at equal intervals along a lateral direction of the plasma panel stack 20 (a direction perpendicular to a stacking direction of the electrode panels 30), and the second clamps 53 to 55 are disposed on the gas non-passage face 26 at equal intervals along a lateral direction of the plasma panel stack 20. The first clamp 51 of the first clamps 50 to 52 disposed at a central portion of the gas non-passage face 24 and the second clamp 54 of the second clamps 53 to 55 disposed at a central portion of the gas non-passage face 26 have a function as an electrically conductive member electrically connected to the discharge electrodes 34 in addition to the function of clamping the electrode panels 30 in the stacking direction. The first clamps 50 and 52 of the first clamps 50 to 52 disposed at opposite side portions of the gas non-passage face 24 and the second clamps 53 and 55 of the second clamps 53 to 55 disposed at opposite side portions of the gas non-passage face 26 have only the function of clamping the electrode panels 30 in the stacking direction.

As shown in FIGS. 7 and 8, each of the clamps 50 to 55 has a clamp body 56 and press plates 57. The clamp body 56 extends in the stacking direction of the electrode panels 30. The press plates 57 are formed integrally with the clamp body 56 and disposed at respective opposite end portions of the clamp body 56. Each of the press plates 57 is a plate spring having elasticity and a bend structure. The two press plates 57 of the individual clamps 50 to 55 are in pressure contact with the gas non-passage face 23 and the gas non-passage face 25, respectively, of the plasma panel stack 20. The two press plates 57 of the individual clamps 51 and 54 are in pressure contact with the first pad 42 formed on the gas non-passage face 23 (the first main surface 31 of the top electrode panel 30) and the second pad 43 formed on the gas non-passage face 25 (the second main surface 32 of the bottom electrode panel 30), respectively.

As shown in FIGS. 2 to 8, the plasma reactor 1 has a pair of external terminals 60 and 61. The external terminals 60 and 61 of the present embodiment has a structure similar to that of a spark plug. Specifically, each of the external terminals 60 and 61 includes an external connection member, an electrically conductive seal containing metal powder, an insulator, a metallic shell, talc, packings, etc. The external connection member is connected to a center rod 62 through the electrically conductive seal. The structure of the external terminal is not limited to that of the present embodiment. Another structure may be employed so long as the insulator provides electrical insulation between the external connection member and the case 10.

Figure 2:
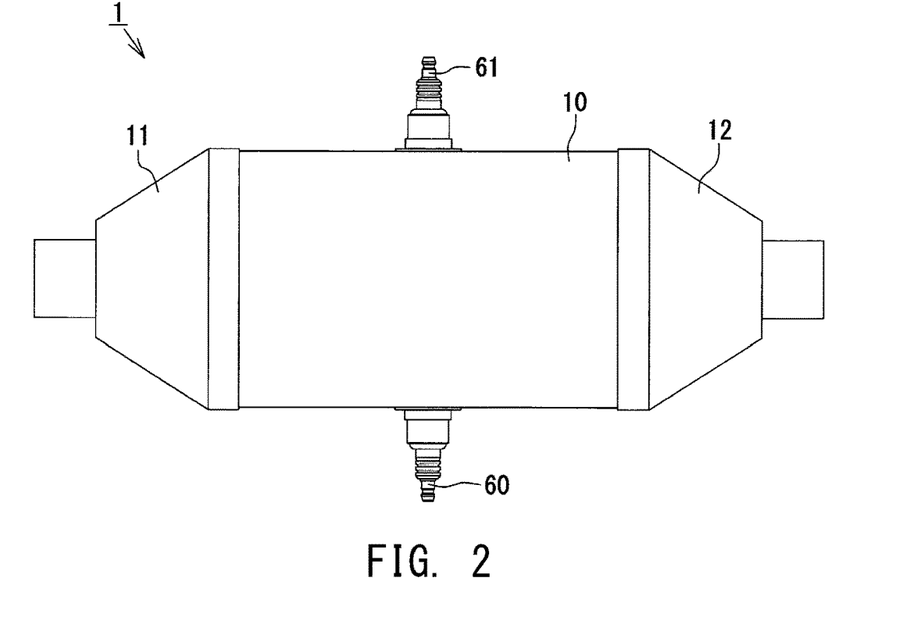
FIG. 2 Plan view showing the plasma reactor.
Figure 3:
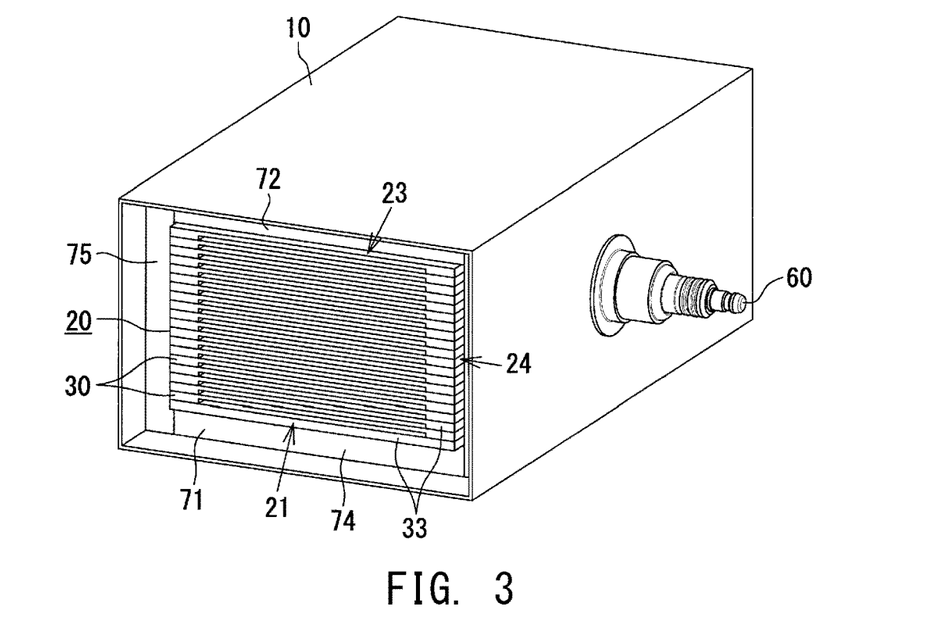
FIG. 3 Perspective view showing a state in which a plasma panel stack is housed in a case.
Figure 4:
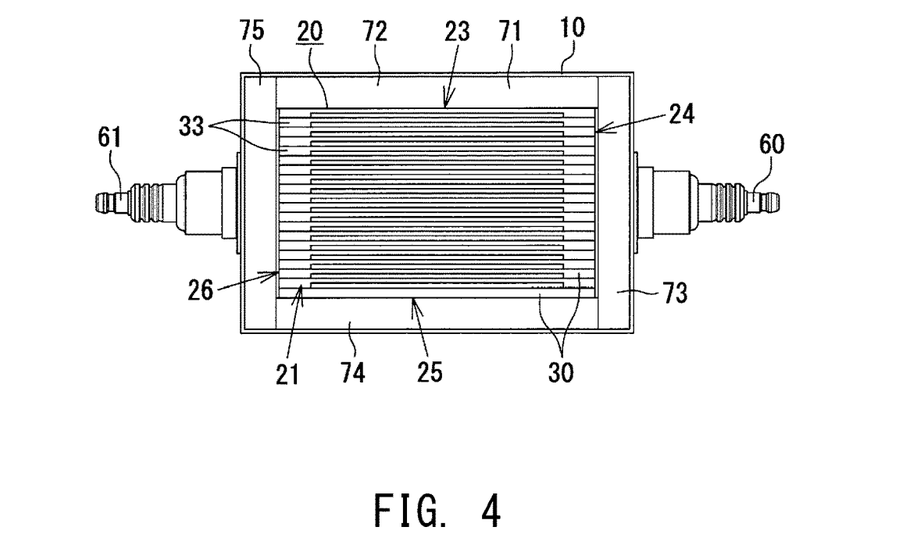
FIG. 4 Side view showing a state in which the plasma panel stack is housed in the case.

The external terminal 60 is configured such that a proximal end portion thereof is electrically connected to the clamp body 56 of the first clamp 51, while a distal end portion thereof is exposed from the case 10 (see FIGS. 2 to 4). Similarly, the external terminal 61 is configured such that a proximal end portion thereof is electrically connected to the clamp body 56 of the second clamp 54, while a distal end portion thereof is exposed from the case 10. That is, the external terminal 60 is disposed at the gas non-passage face 24 of the plasma panel stack 20, and the external terminal 61 is disposed at the gas non-passage face 26 located opposite the gas non-passage face 24. The external terminals 60 and 61 protrude in mutually opposite directions. In the present embodiment, the distal end portion of the external terminal 60 is connected to the first wiring line 6 (see FIG. 1), and the distal end portion of the external terminal 61 is connected to the second wiring line 7 (see FIG. 1).

As shown in FIGS. 3 to 6, a mat 71 having a rectangular frame shape as viewed from a side intervenes between the case 10 and the plasma panel stack 20. The mat 71 has the function of fixing the plasma panel stack 20 to the case 10. The mat 71 covers an external surface of the plasma panel stack 20. Specifically, the mat 71 is composed of a first mat piece 72 having an approximately rectangular plate shape and covering the gas non-passage face 23, a second mat piece 73 having an approximately rectangular plate shape and covering the gas non-passage face 24, a third mat piece 74 having an approximately rectangular plate shape and covering the gas non-passage face 25, and a fourth mat piece 75 having an approximately rectangular plate shape and covering the gas non-passage face 26. The mat 71 is configured by bonding the mat pieces 72 to 75 together by use of adhesive tape or the like as needed. An insulating material, such as ceramic fiber, metal fiber, or porosity metal, can be used to form the mat 71.

Figure 5:
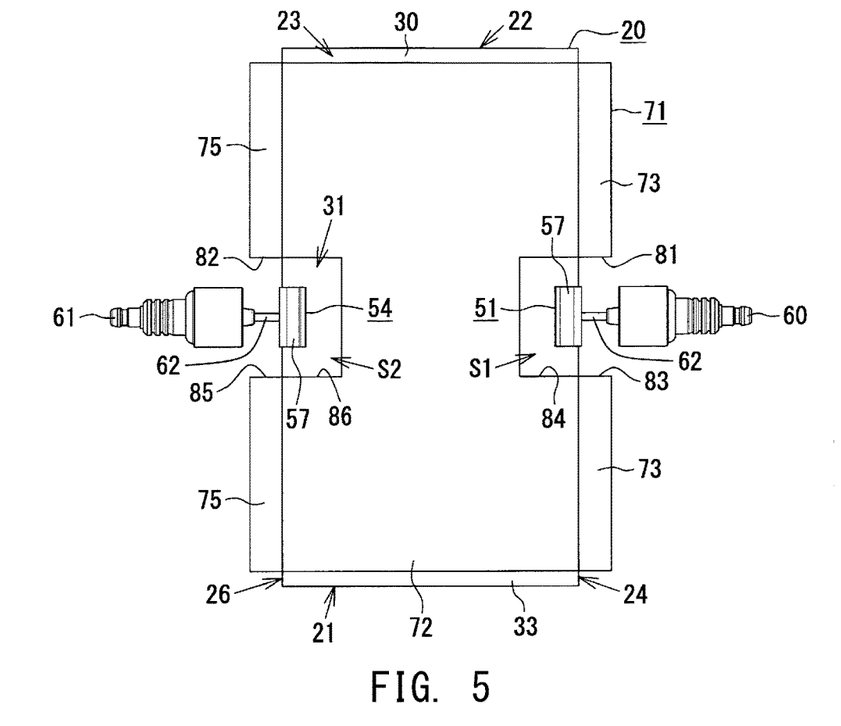
FIG. 5 Plan view showing the plasma panel stack, clamps, external terminals, and a mat.
Figure 6:
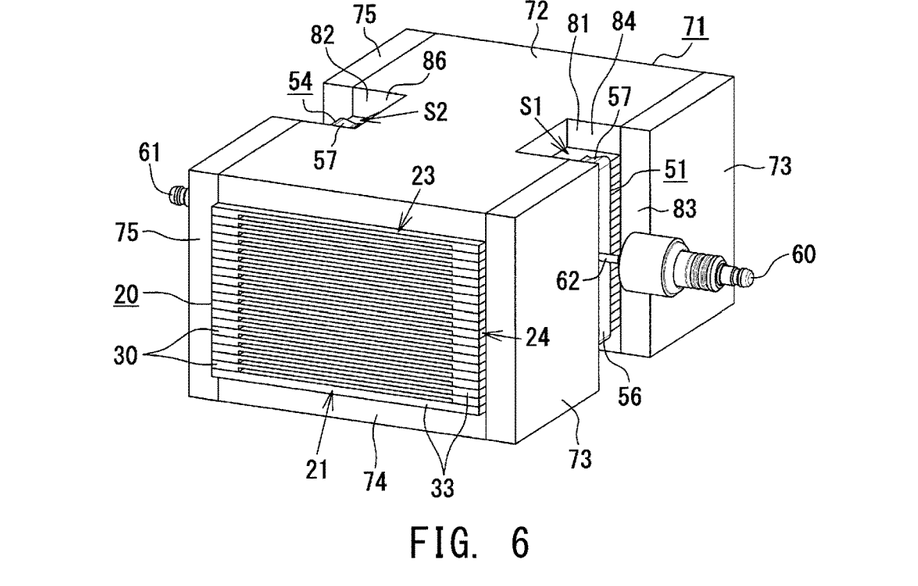
FIG. 6 Perspective view showing the plasma panel stack, the clamps, the external terminals, and the mat.

As shown in FIGS. 5 and 6, the mat 71 is disposed in contact with the clamps 50, 52, 53, and 55 not functioning as the electrically conductive members and is spaced apart from the clamps 51 and 54 functioning as the electrically conductive members so that gaps are formed between the mat 71 and the clamps 51 and 54. The mat 71 of the present embodiment has a first cutout 81 extending therethrough in the thickness direction thereof so as to avoid interference with the first clamp 51 and has a second cutout 82 extending therethrough in the thickness direction thereof so as to avoid interference with the second clamp 54. The first clamp 51 is disposed in the first cutout 81, and the second clamp 54 is disposed in the second cutout 82.

Specifically, the first cutout 81 is composed of a first groove 83 extending through the second mat piece 73 in the thickness direction thereof and a pair of first recesses 84 extending through the mat pieces 72 and 74, respectively, in the thickness direction thereof. The first groove 83 extends in the stacking direction of the electrode panels 30 to divide the second mat piece 73. The first recesses 84 are formed in such a manner as to recede from the peripheries of the mat pieces 72 and 74, and do not divide the mat pieces 72 and 74. The clamp body 56 of the first clamp 51 and the proximal end portion of the external terminal 60 are disposed in the first groove 83, and the press plates 57 of the first clamp 51 are disposed in the respective first recesses 84. A first gap S1 is present between the mat 71 and the first clamp 51 (specifically, between the inner wall surfaces of the first groove 83 and the side edges of the clamp body 56 and between the inner side surfaces of the first recesses 84 and the outer peripheral edges of the press plates 57). The size of the first gap S1 is set to fall within the range of 2 mm to 30 mm (in the present embodiment, a minimum of 5 mm).

As shown in FIGS. 5 and 6, the second cutout 82 is composed of a second groove 85 extending through the fourth mat piece 75 in the thickness direction thereof and a pair of second recesses 86 extending through the mat pieces 72 and 74, respectively, in the thickness direction thereof. The second groove 85 extends in the stacking direction of the electrode panels 30 to divide the fourth mat piece 75. The second recesses 86 are formed in such a manner as to recede from the peripheries of the mat pieces 72 and 74, and do not divide the mat pieces 72 and 74. The clamp body 56 of the second clamp 54 and the proximal end portion of the external terminal 61 are disposed in the second groove 85, and the press plates 57 of the second clamp 54 are disposed in the respective second recesses 86. A second gap S2 is present between the mat 71 and the second clamp 54 (specifically, between the inner wall surfaces of the second groove 85 and the side edges of the clamp body 56 and between the inner side surfaces of the second recesses 86 and the outer peripheral edges of the press plates 57). The size of the second gap S2 is the same as the size of the first gap S1 and is set to fall within the range of 2 mm to 30 mm (in the present embodiment, a minimum of 5 mm).

As shown in FIG. 1, the plasma reactor 1 of the present embodiment is used to remove PM contained in exhaust gas, for example. In this case, when the pulse generation power supply 3 applies pulse voltage (e.g., peak voltage: 5 kV (5,000 V), repetition frequency of pulse: 100 Hz) between the adjacent electrode panels 30, dielectric barrier discharge is generated; as a result, plasma derived from dielectric barrier discharge is generated between the discharge electrodes 34. The generated plasma oxidizes (burns) PM contained in exhaust gas flowing between the discharge electrodes 34 to thereby remove PM.

Next, a method of manufacturing the plasma reactor 1 will be described.

First, by use of a ceramic material which contains alumina powder as a main component, first to third ceramic green sheets which are to become the dielectrics 33 are formed. A well-known forming method such as tape casting or extrusion can be used to form the ceramic green sheets. The ceramic green sheets are subjected to laser machining to form through holes at predetermined positions. Punching, drilling, or the like may be employed to form the through holes.

Next, by use of a conventionally known paste printing apparatus (not shown), the through holes of the ceramic green sheets are filled with electrically conductive paste (in the present embodiment, tungsten paste), thereby forming green through hole conductors which are to become the through hole conductors 41.

Next, the first ceramic green sheet is placed on a support table (not shown). Further, by use of the paste printing apparatus, electrically conductive paste is printed on the back surface of the first ceramic green sheet. As a result, a green electrode which has a thickness of 10 μm and is to become the discharge electrode 34 is formed on the back surface of the first ceramic green sheet. A well-known printing method such as screen printing can be used to print the green electrode on the first ceramic green sheet.

After the printed electrically conductive paste is dried, the second ceramic green sheet and the third ceramic green sheet are sequentially laminated on the back surface of the first ceramic green sheet on which the green electrode is printed, followed by application of pressing force in a sheet laminating direction. As a result, the ceramic green sheets are united together into a ceramic laminate. Further, by use of the paste printing apparatus, electrically conductive paste is printed on the main surface of the first ceramic green sheet so as to form green first pads 42, and electrically conductive paste is printed on the back surface of the third ceramic green sheet so as to form green second pads 43. Notably, the third ceramic green sheet is laminated after a recess corresponding to the recess 35 is formed by stamping.

Next, after performing a drying process and a dewaxing process according to well-known methods, the ceramic laminate (the ceramic green sheets and the green electrodes) is subjected to simultaneous firing at such a predetermined temperature (e.g., about 1,400° C. to 1,600° C.) as to sinter alumina and tungsten. As a result, alumina contained in the ceramic green sheets and tungsten contained in the electrically conductive paste are simultaneously sintered, and the dielectric 33, the discharge electrode 34, the through hole conductors 41, the first pads 42, and the second pads 43 are formed by simultaneous firing, whereby the ceramic laminate becomes the electrode panel 30.

Subsequently, a plurality of the thus-obtained electrode panels 30 are stacked to thereby form the plasma panel stack 20. Next, by use of the clamps 50 to 55, the plurality of electrode panels 30 are fixedly clamped in the stacking direction. At this time, pairs of the press plates 57 of the clamps 51 and 54 come into pressure contact with the first pads 42 and the second pads 43. Further, by performing welding or the like, a proximal end portion of the external terminal 60 is connected to the clamp body 56 of the first clamp 51 through the center rod 62, and a proximal end portion of the external terminal 61 is connected to the clamp body 56 of the second clamp 54 through the center rod 62. Next, after the mat 71 is attached in such a manner as to cover an external surface of the plasma panel stack 20, the case 10 is attached in such a manner as to cover an external surface of the mat 71. Subsequently, the first wiring line 6 is connected to a distal end portion of the external terminal 60, and the second wiring line 7 is connected to a distal end portion of the external terminal 61. By the above process, the plasma reactor 1 is completed.

Therefore, according to the present embodiment, the following effects can be yielded.

(1) According to the plasma reactor 1 of the present embodiment, the mat 71 intervening between the case 10 and the plasma panel stack 20 is disposed apart from the clamps 51 and 54 so that the gaps S1 and S2 are formed between the mat 71 and the clamps 51 and 54, respectively. As a result, insulation is secured between the mat 71 and the clamps 51 and 54 connected to the discharge electrodes 34 of the plasma panel stack 20 and, in turn, between the case 10 and the clamps 51 and 54. Accordingly, even when the mat 71 absorbs water and comes into a water-containing state as a result of inflow of water into the plasma reactor 1, since electrical conduction between the case 10 and the clamps 51 and 54 through the mat 71 is prevented, there can be prevented the generation of leak current which could otherwise result from electrical conduction between the case 10 and the clamps 51 and 54. Consequently, since plasma is generated in a sufficient amount in relation to supplied electric power, PM contained in exhaust gas flowing between the adjacent electrode panels 30 can be efficiently removed through oxidation by use of plasma.

(2) According to the present embodiment, the mat 71 has the cutouts 81 and 82 formed therein so as to avoid interference with the clamps 51 and 54, respectively, whereby the gaps S1 and S2 are provided between the mat 71 and the clamps 51 and 54, respectively. Therefore, the number of parts of the plasma reactor 1 can be reduced as compared with the case where, for example, a plurality of mats are disposed with the clamps disposed between the mats in such a manner as to provide the gaps between the mats and the clamps.

(3) The plasma reactor 1 of the present embodiment is attached to the exhaust pipe 2 through the first cone 11 and the second cone 12. As a result, since there is reduced flow resistance of exhaust gas flowing through an exhaust gas passage; specifically, the upstream portion 4 of the exhaust pipe 2→the first cone 11→the plasma reactor 1→the second cone 12→the downstream portion 5 of the exhaust pipe 2, pressure loss in the exhaust gas passage can be reduced. Furthermore, there can be prevented a reduction in engine output stemming from pressure loss.

The above embodiment may be modified as follows.

According to the above embodiment, the mat 71 has the cutouts 81 and 82 formed therein so as to avoid interference with the clamps 51 and 54, respectively, whereby the gaps S1 and S2 are provided between the mat 71 and the clamps 51 and 54, respectively; however, another structure may be employed to provide gaps. For example, the structure shown in FIGS. 10 and 11 may be employed; specifically, two mats 91 and 92 are disposed apart from each other along the passing direction of exhaust gas so as to completely separate the two mats 91 and 92, and clamps 93 and 94 serving as the electrically conductive members are disposed between the adjacent mats 91 and 92 to thereby provide gaps S3 between the mats 91 and 92 and the clamps 93 and 94.

Figure 10:
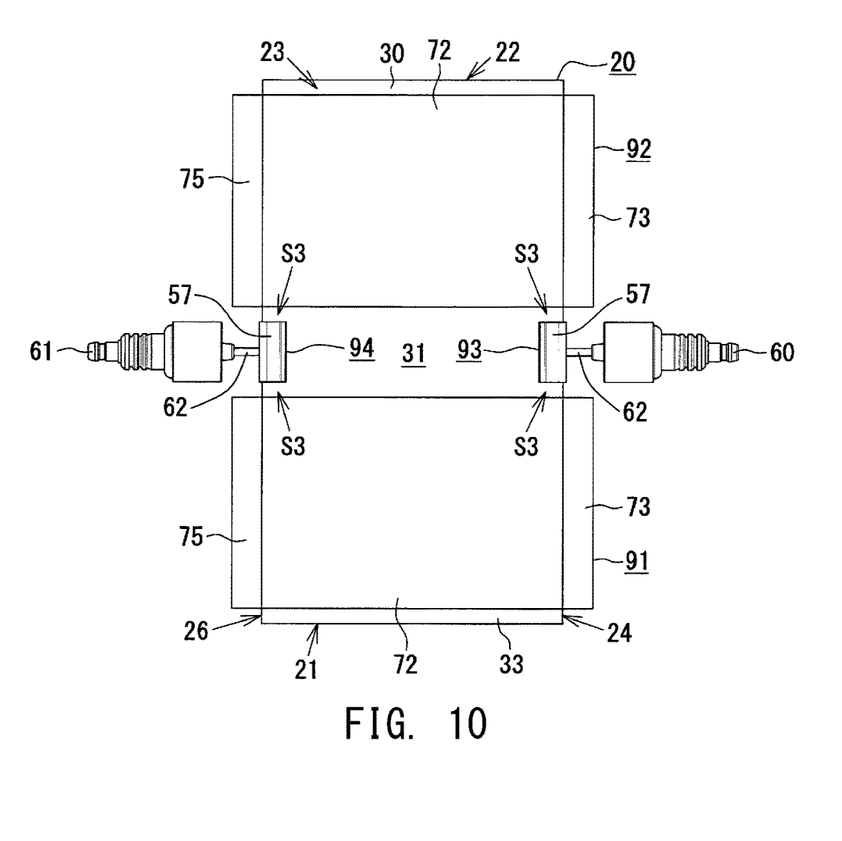
FIG. 10 Plan view showing the plasma panel stack, the clamps, the external terminals, and mats in another embodiment.
Figure 11:
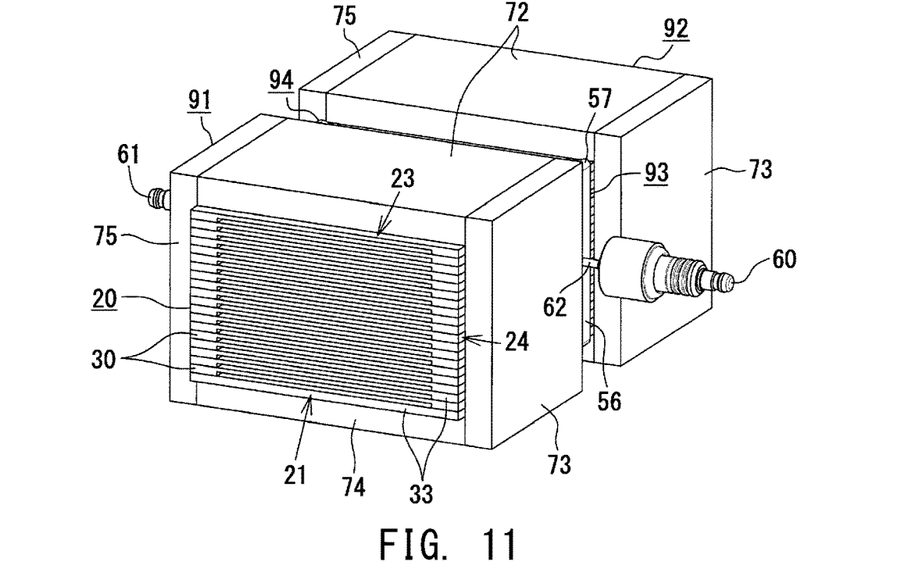
FIG. 11 Perspective view showing the plasma panel stack, the clamps, the external terminals, and the mats in the another embodiment.

The structure shown in FIGS. 10 and 11 further has the following advantage.

For example, even when, as a result of inflow of water into the plasma panel stack 20 from the upstream portion 4 of the exhaust pipe 2, the mat 91 located on the inflow side absorbs water and comes into a water-containing state, the mat 91 retains water therein. Thus, the other mat 92 located apart from the mat 91 is unlikely to be exposed to water, thereby preventing the case where all of the plurality of mats absorb water. Also, even when, as a result of inflow of water into the plasma panel stack 20 from the downstream portion 5 of the exhaust pipe 2, the mat 92 located on the inflow side absorbs water, the mat 92 retains water therein. Thus, the other mat 91 located apart from the mat 92 is unlikely to be exposed to water, thereby preventing the case where all of the plurality of mats absorb water.

As a result, since infiltration of water between the plasma panel stack 20 and the case 10 can be reduced, deterioration in electrostatic capacity between the case 10 and the clamps 51 and 54 is restrained, whereby there can be restrained the generation of leak current which could otherwise result from electrical conduction (i.e., excessive deterioration in electrostatic capacity) between the case 10 and the clamps 51 and 54.

Additionally, in the case of the present plasma reactor, since the two mats 91 and 92 have the same dimensions, manufacture of the plasma reactor allows preparation of only one type of the mats 91 and 92. Therefore, production at low cost can be readily achieved. Also, since the mats 91 and 92 have a rectangular frame shape as viewed from a side, the mats 91 and 92 are suited for surrounding the plasma panel stack 20 having an approximately rectangular parallelepiped shape. Therefore, the plasma reactor can be manufactured relatively easily.

Figure 12:
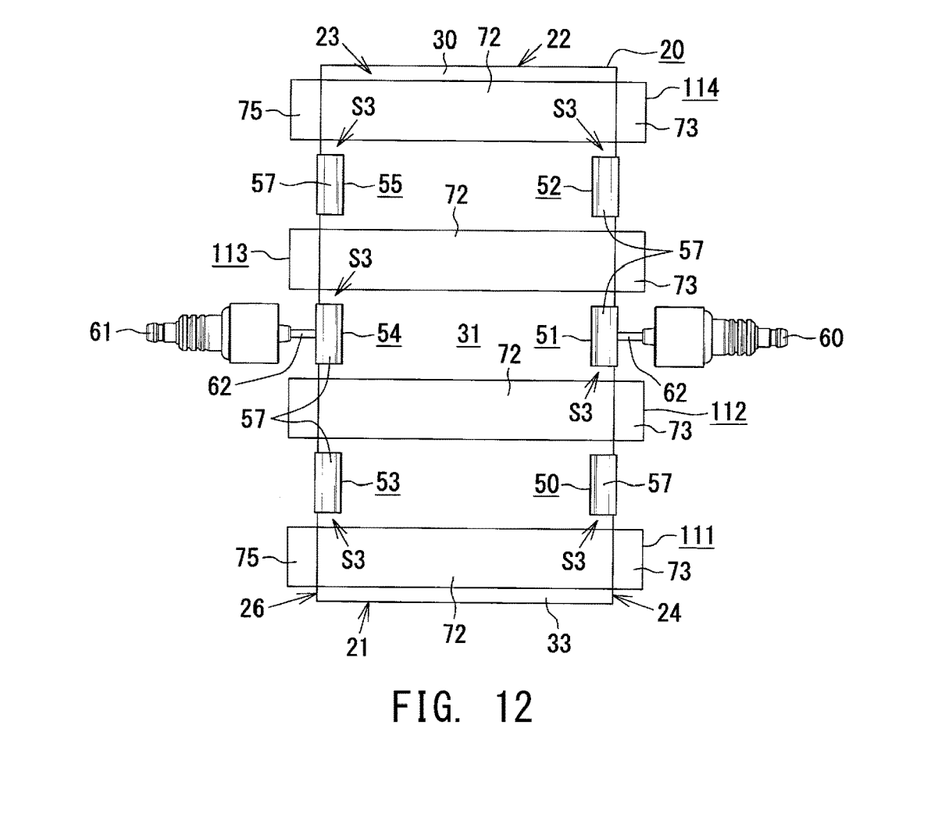
FIG. 12 Plan view showing the plasma panel stack, the clamps, the external terminals, and mats in a further embodiment.
Figure 13:
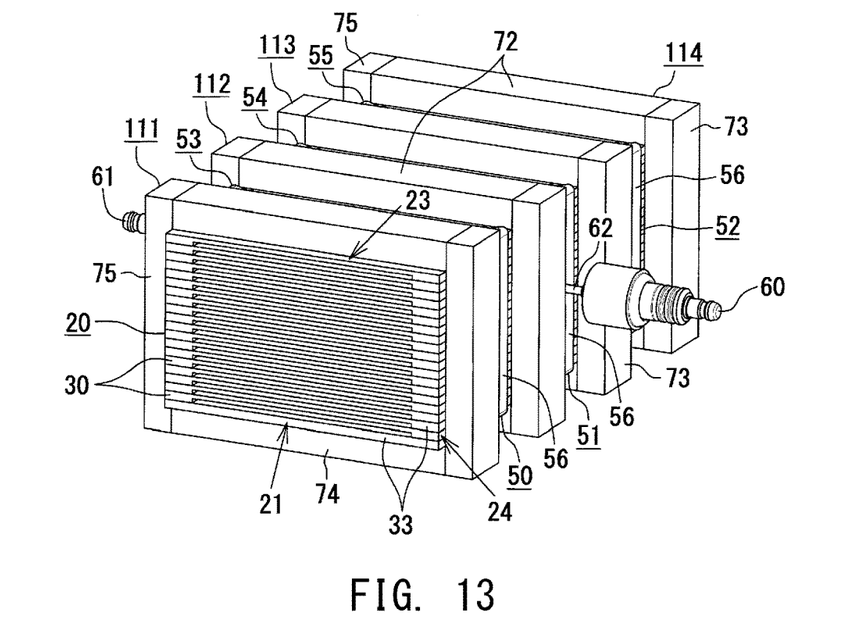
FIG. 13 Perspective view showing the plasma panel stack, the clamps, the external terminals, and the mats in the further embodiment.

In the plasma reactor shown in FIGS. 10 and 11, the two mats 91 and 92 are disposed apart from each other along the passing direction of exhaust gas; however, the number of mats is not limited to two, but may be greater than two (3, 4, 5, 6, . . . ). In the plasma reactor shown in FIGS. 12 and 13, four mats 111, 112, 113, and 114 are used. Even in such a structure, since a mat exposed to water retains water therein, the other mats located apart from the mat are unlikely to be exposed to water. Therefore, absorption of water by all of the plurality of mats is prevented.

Figure 14:
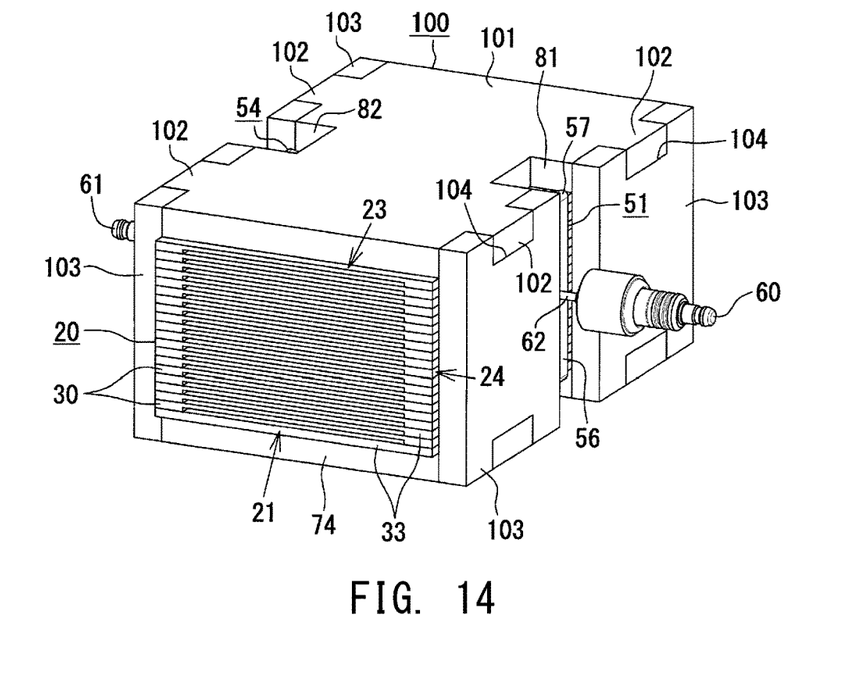
FIG. 14 Perspective view showing the plasma panel stack, the clamps, the external terminals, and a mat in a still further embodiment.

The mat 71 of the above embodiment is configured by bonding the mat pieces 72 to 75 together by use of adhesive tape or the like as needed; however, another method may be used to configure the mat. For example, as shown in FIG. 14, a mat 100 may be configured as follows: protrusions 102 protruding from the peripheries of mat pieces 101 are fitted into recesses 104 recessed from the peripheries of adjacent mat pieces 103.

The electrode panel 30 of the above embodiment is configured such that the discharge electrode 34 is incorporated in the dielectric 33. However, the electrode panel may be formed by forming the discharge electrode 34 on the surface of the dielectric 33.

The plasma reactor 1 of the above embodiment is used for cleaning exhaust gas from the engine of an automobile, but may be used for cleaning exhaust gas from the engine of a ship, for example. No particular limitation is imposed on application of the plasma reactor 1 so long as the plasma reactor 1 performs plasma processing; i.e., the plasma reactor 1 may not need to be applied to processing of exhaust gas or cleaning.

Next, besides the technical ideas described in claims, technical ideas understood from the above embodiment are enumerated below.

(1) In means 1 mentioned above, the plasma reactor is characterized in that the mat has a cutout extending therethrough in a thickness direction thereof so as to avoid interference with the electrically conductive member, and the cutout extends along a stacking direction of the plurality of electrode panels.

(2) In means 1 mentioned above, the plasma reactor is characterized in that the mat covers an external surface of the plasma panel stack.

(3) In means 1 mentioned above, the plasma reactor is characterized in that: the electrode panel has a first main surface and a second main surface; the electrode panel has an electrically conductive structure for establishing electrical conduction between a first main surface side and a second main surface side; and the electrically conductive structure comprises a through hole conductor extending through the first main surface and the second main surface, a first pad formed on the first main surface and electrically connected to a first-main-surface-side end portion of the through hole conductor, and a second pad formed on the second main surface and electrically connected to a second-main-surface-side end portion of the through hole conductor.

DESCRIPTION OF REFERENCE NUMERALS

1: plasma reactor
10: case
20: plasma panel stack
30: electrode panel
34: discharge electrode
41: through hole conductor serving as electrically conductive member
42: first pad serving as electrically conductive member
43: second pad serving as electrically conductive member
51: first clamp serving as electrically conductive member
54: second clamp serving as electrically conductive member
71, 91, 92, 100, 111, 112, 113, 114: mat
81: first cutout serving as cutout
82: second cutout serving as cutout
93, 94: clamp serving as electrically conductive member
S1: first gap serving as gap
S2: second gap serving as gap
S3: gap

What is claimed is:

1. A plasma reactor comprising:
   a plasma panel stack having a structure in which a plurality of electrode panels each having a discharge electrode are stacked, and generating plasma upon application of voltage between the adjacent electrode panels;
   an electrically conductive member electrically connected to the discharge electrodes of the plurality of electrode panels, the electrically conductive member including
      a main body part extending in a stacking direction of the plasma panel stack, and
      plate parts respectively connected to both ends of the main body part and respectively disposed at upper and lower surfaces of the plasma panel stack;
   a case housing the plasma panel stack; and
   a mat intervening between the case and the plasma panel stack and fixing the plasma panel stack to the case;
   the plasma reactor being characterized in that the mat is disposed apart from the electrically conductive member so that a gap having a size of 2 mm to 30 mm is present between the mat and the electrically conductive member.

2. A plasma reactor according to claim 1, wherein the mat has a cutout extending therethrough in a thickness direction thereof so as to avoid interference with the electrically conductive member, thereby providing the gap between the mat and the electrically conductive member.

3. A plasma reactor according to claim 1, wherein a plurality of the mats are disposed apart from one another, and the electrically conductive member is located between the adjacent mats.

4. A plasma reactor comprising:
   a plasma panel stack having a structure in which a plurality of electrode panels each having a discharge electrode are stacked, and generating plasma upon application of voltage between the adjacent electrode panels with gas passing between the adjacent electrode panels;
   an electrically conductive member electrically connected to the discharge electrodes of the plurality of electrode panels;
   a case housing the plasma panel stack; and
   a plurality of mats intervening between the case and the plasma panel stack and fixing the plasma panel stack to the case;
   the plasma reactor being characterized in that each of the plurality of the mats are disposed apart from one another along a passing direction of the gas;
   wherein each of the plurality of mats has a rectangular frame shape as viewed from a side.

5. A plasma reactor according to claim 4, wherein the mats have the same dimensions.

* * * * *